United States Patent
Tsay et al.

(10) Patent No.: US 11,668,376 B2
(45) Date of Patent: Jun. 6, 2023

(54) CAM TRANSMISSION MECHANISM WITH BALL FOLLOWERS

(71) Applicant: National Sun Yat-Sen University, Kaohsiung (TW)

(72) Inventors: Der-Min Tsay, Kaohsiung (TW); Kun-Lung Hsu, Kaohsiung (TW); Wei-Ming Chen, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 0 days.

(21) Appl. No.: 17/946,865

(22) Filed: Sep. 16, 2022

(65) Prior Publication Data

US 2023/0086375 A1     Mar. 23, 2023

(30) Foreign Application Priority Data

Sep. 17, 2021   (TW) .................. 110134829

(51) Int. Cl.
*F16H 25/06*  (2006.01)

(52) U.S. Cl.
CPC ....... *F16H 25/06* (2013.01); *F16H 2025/063* (2013.01)

(58) Field of Classification Search
CPC . F16H 25/04; F16H 1/16; F16H 1/166; F16H 3/06; F16H 55/02; F16H 2025/063; F16H 25/06
See application file for complete search history.

(56) References Cited

U.S. PATENT DOCUMENTS

| | | | | |
|---|---|---|---|---|
| 11,549,578 B2 * | 1/2023 | Aberle | ............... | F16H 55/08 |
| 2018/0340602 A1 * | 11/2018 | Aberle | ............... | F16H 55/0846 |
| 2018/0340603 A1 * | 11/2018 | Aberle | ............... | F16H 55/22 |
| 2021/0088126 A1 * | 3/2021 | Bachmann | ............ | B62D 5/0454 |
| 2021/0190191 A1 * | 6/2021 | Seol | ............... | F16H 1/16 |

FOREIGN PATENT DOCUMENTS

| | | |
|---|---|---|
| CN | 105757179 A | 7/2016 |
| CN | 110107653 A | 8/2019 |
| CN | 113175499 A | 7/2021 |
| CN | 113175500 A | 7/2021 |
| TW | 279487 | 6/1996 |
| TW | 308246 U | 6/1997 |
| TW | M603501 U | 11/2020 |

OTHER PUBLICATIONS

Search Report appended to an Office Action, which was issued to Taiwanese counterpart application No. 110134829 by the TIPO dated Mar. 31, 2022, with an English translation thereof.

* cited by examiner

*Primary Examiner* — David M Fenstermacher

(74) *Attorney, Agent, or Firm* — Muncy, Geissler, Olds & Lowe, P.C.

(57) ABSTRACT

A cam transmission mechanism includes a rotary disk, a camshaft, contact members and a housing. The rotary disk has a periphery formed with equidistant projections, any two adjacent ones of which define an accommodating recess. The camshaft includes a shaft rod and a cam body that has at least one groove communicated with some of the recesses of the rotary disk. The groove and the recesses cooperate to form a plurality of confining spaces, within which the contact members are accommodated freely rollably for rotation transfer from the camshaft to the rotary disk. The housing is connected to the rotary disk for confining the contact members in the confining spaces, respectively.

9 Claims, 13 Drawing Sheets

CAM TRANSMISSION MECHANISM WITH BALL FOLLOWERS

CROSS-REFERENCE TO RELATED APPLICATIONS

This application claims priority of Taiwanese Invention Patent Application No. 110134829, filed on Sep. 17, 2021.

FIELD

The disclosure relates to a mechanical power transmission mechanism, more particularly to a cam transmission mechanism with ball followers.

BACKGROUND

Referring to FIGS. 1 and 2, a conventional cam transmission mechanism 1 includes a cam unit 12 in transmission connection with a revolving disk unit 11. The revolving disk unit 11 consists of a disk plate 111 and a plurality of cam-follower contacts 112 angularly equally distributed around the disk plate 111. The disk plate 111 is formed with a plurality of slots 110 for accommodating the cam-follower contacts 112, respectively. Each cam-follower contact 112 has a fixing pin 118 disposed in the slots 110 and a spherical portion 119 partly protruding above the disk plate 111. The protruding part of the spherical portion 119 is generally semi-spherical. The cam unit 12 includes a shaft 121 that rotates about an axis perpendicular to the rotating axis of the disk plate 111 and a cam body 122 sleeved on the shaft 121. The cam body 122 includes a spiral rib 129 that extends around the shaft 121 and that defines a spiral groove 120 for accommodating some of the cam-follower contacts 112.

When the cam unit 12 is driven by a power source (not shown), the shaft 121 rotates, so that the cam portions of the cam unit 12 defining the spiral groove 120 come into contact with the cam-follower contacts 112, producing a pushing force to the disk plate 111 in a tangential direction of the disk plate 111, so as to rotate the disk unit 11 in a direction different from that of the cam unit 12. Specifically, the rotation axes of the disk plate 111 and the shaft 121 are perpendicular to each other, transmitting the rotational power of the cam unit 12 in a different direction.

However, the processing and preparation of the fixing pin 118 having high precision structure required for securely fixing the cam-follower contacts 112 on the disk plate 111 will inevitably affect the efficiency and manufacturing cost. Additionally, because the cam-follower contacts 112 are disposed to the disk plate 111, the structure of the disk plate 111 will bear most of the loading during transmission, except for the effective power transmitted along the tangential direction of the disk plate 111 for rotation. Because of the large bearing load of the cam transmission mechanism 1, it is necessary to increase the thickness and strength of the revolving disk unit 11 or provide additional load-sharing components to achieve stable operation. Therefore, it is difficult to reduce the dimension of the cam transmission mechanism 1 to meet the needs and trends of miniaturization.

SUMMARY

Therefore, the object of the disclosure is to provide a cam transmission mechanism with ball followers that is relatively simple to process and can reduce the bearing load during operation.

According to the disclosure, a cam transmission mechanism includes a rotary disk, a camshaft, contact members and a housing. The rotary disk has a periphery formed with equidistant projections, any two adjacent ones of which define an accommodating recess. The camshaft includes a shaft rod and a cam body that has at least one groove communicated with some of the recesses of the rotary disk. The groove and the recesses cooperate to form a plurality of confining spaces, within which the contact members are accommodated freely rollably for rotation transfer from the camshaft to the rotary disk. The housing is connected to the rotary disk for confining the contact members in the confining spaces, respectively.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
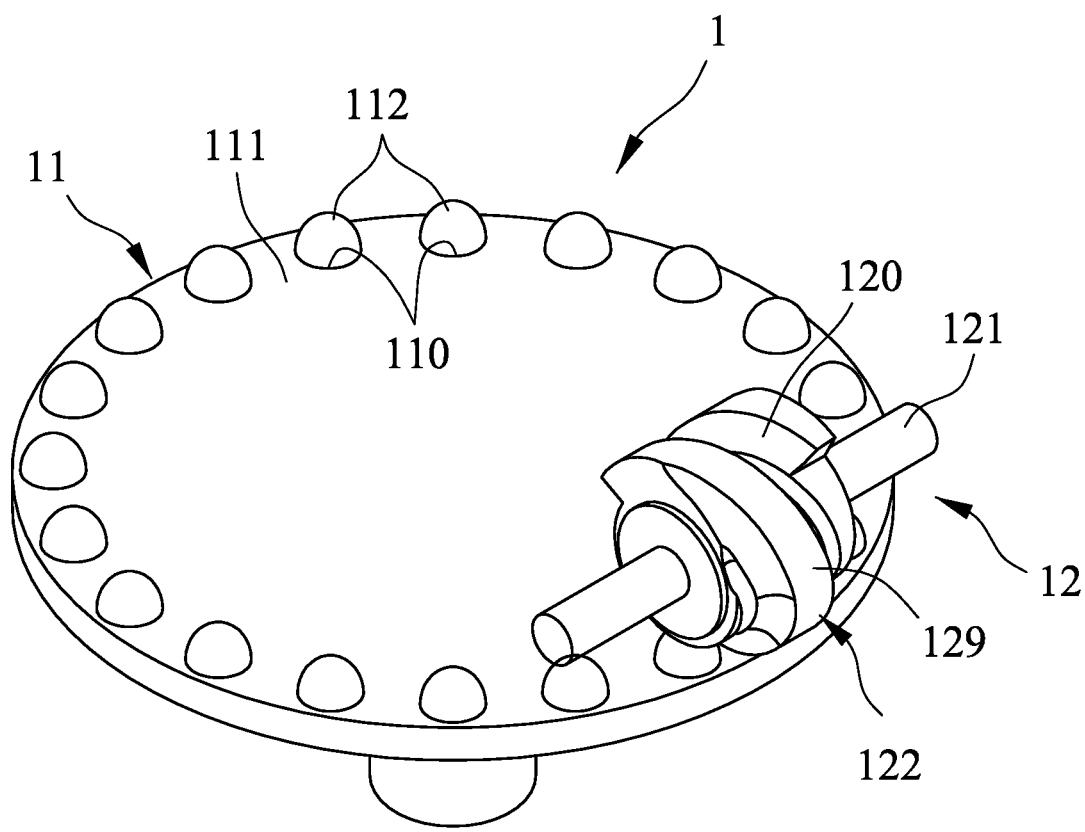
FIG. 1 is a perspective view illustrating a conventional cam transmission mechanism.
Figure 2:
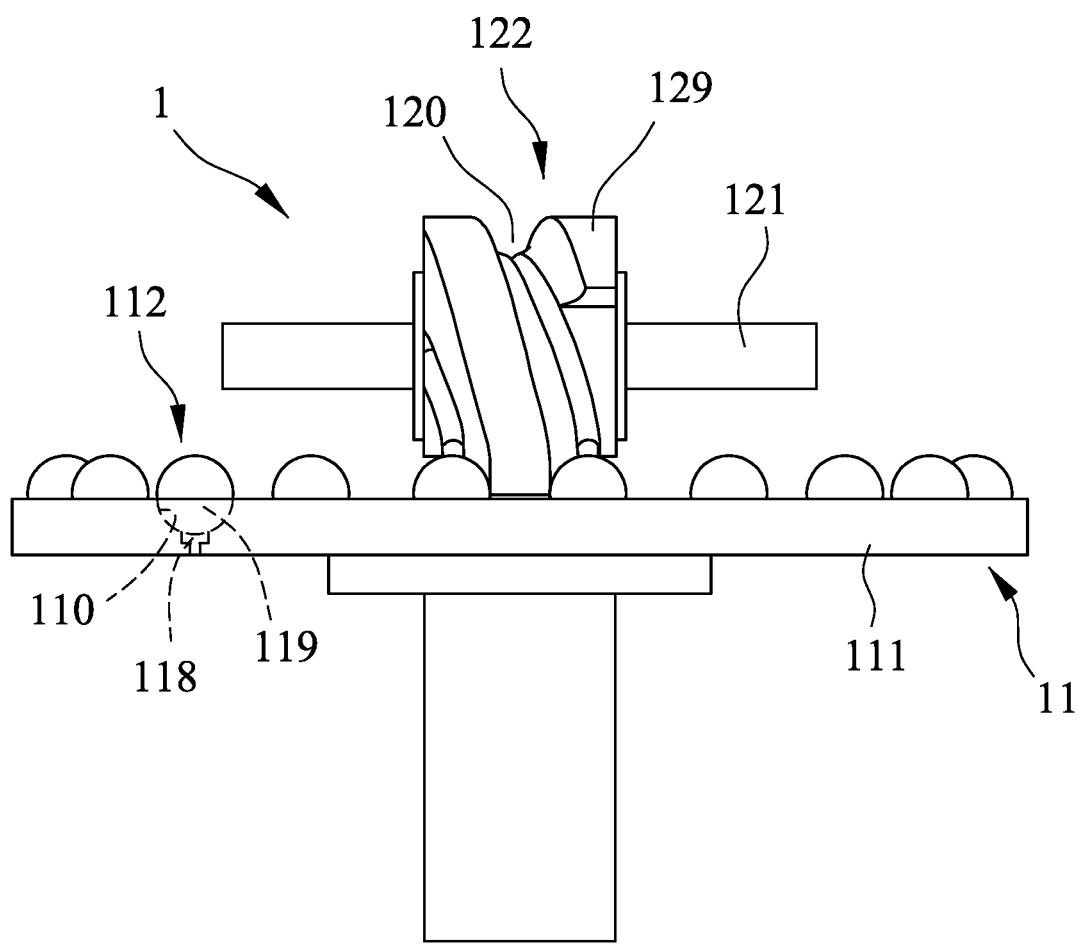
FIG. 2 is a side view illustrating the operation of the conventional cam transmission mechanism.

Before the present invention is described in greater detail, it should be noted that where considered appropriate, reference numerals or terminal portions of reference numerals have been repeated among the figures to indicate corresponding or analogous elements, which may optionally have similar characteristics.

Figure 3:
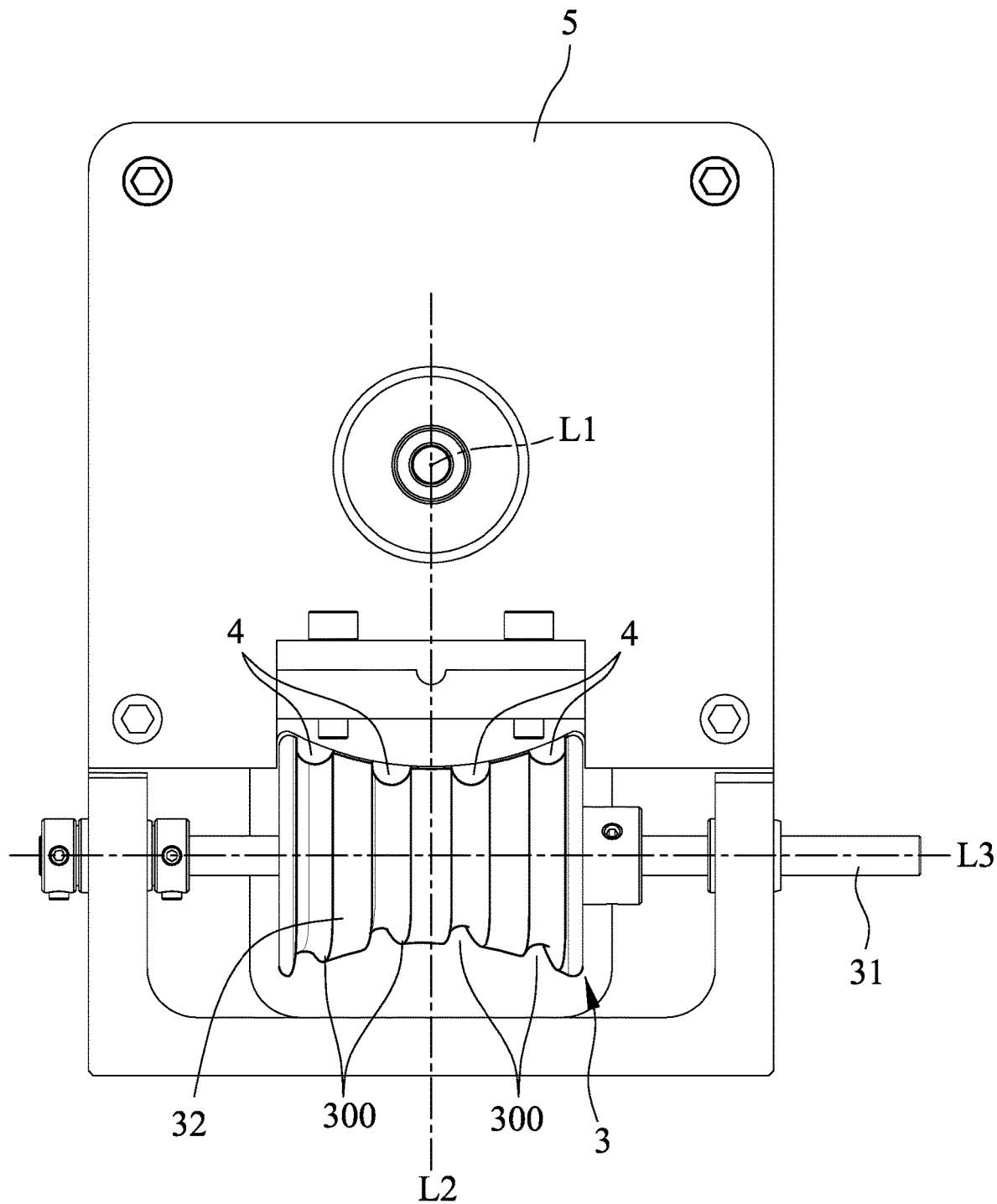
FIG. 3 is a front view of a first embodiment of the cam transmission mechanism according to the disclosure.
Figure 4:
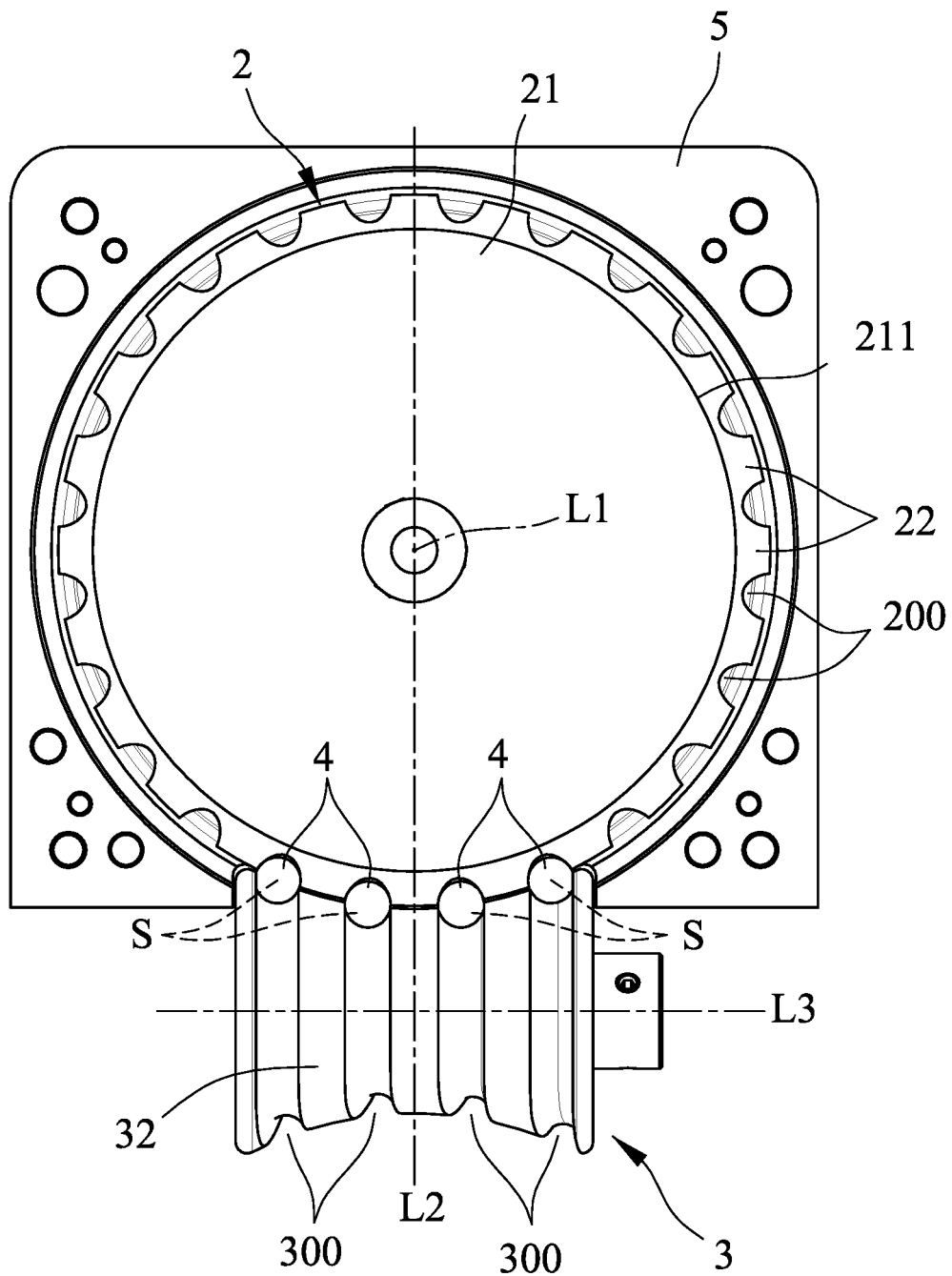
FIG. 4 is a front view illustrating the connection between a rotary disk and a camshaft of the first embodiment.

Referring to FIGS. 3 and 4, the first embodiment of the cam transmission mechanism of the present disclosure includes a rotary disk 2 that is rotatable about a first axis L1, a camshaft 3 adjoining the rotary disk 2 in a direction along a second axis L2 perpendicular to the first axis L1 and is rotatable about a third axis L3 perpendicular to both the first axis L1 and the second axis L2, a plurality of spherical cam-followers contacts 4 and made of metal, and a housing 5 receiving the rotary disk 2.

The rotary disk 2 includes a disk-shaped body 21 that has a periphery 211 formed with a plurality of projections 22, any two adjacent ones of which define an accommodating recess 200 therebetween. Each accommodating recess 200 of the rotary disk 2 has a cross-section in a direction parallel to the first axis L1 selected from the group consisting of the trapezoid, arc, and Gothic arc. In the first embodiment, each accommodating recess 200 preferably has an arc-shaped cross-section in the direction parallel to the first axis L1 to match the spherical shape of each contact member 4. Each accommodating recess 200 extends through the rotary disk 2 in a direction inclined relative to the first axis L1 (see FIG. 13). The camshaft 3 extends to correspond in position to four nearby accommodating recesses 200 for the transmission of rotational power.

Figure 5:
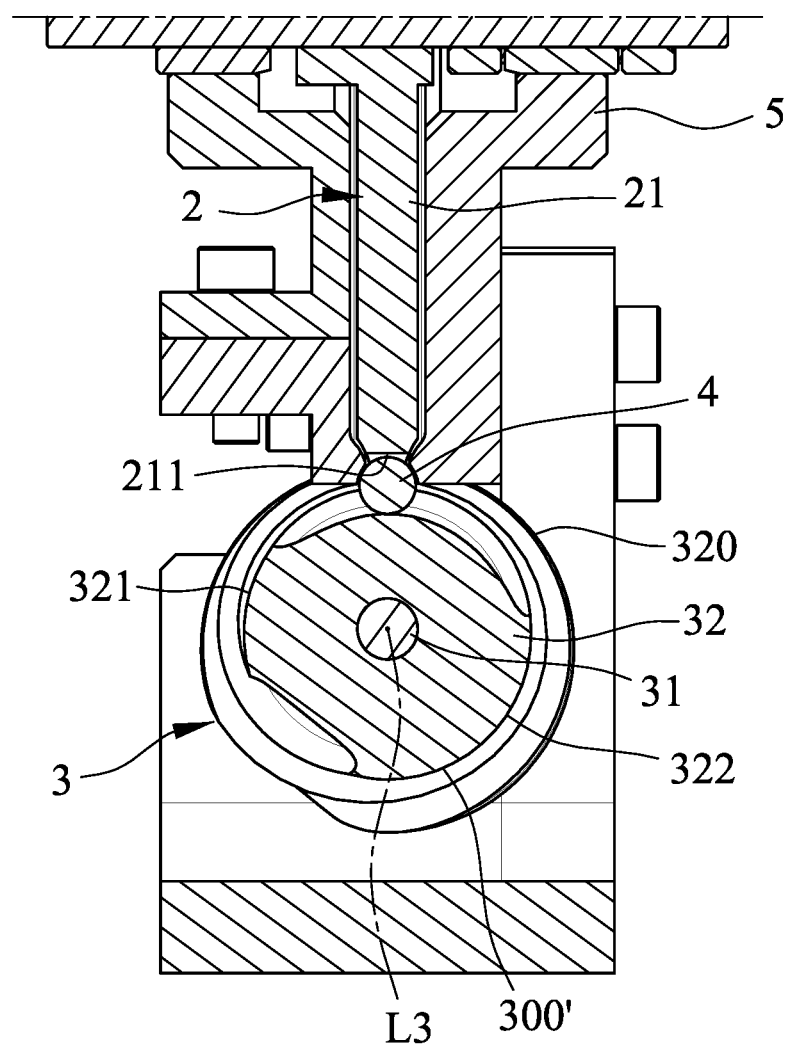
FIG. 5 is a sectional view illustrating the configuration of a cam body of the camshaft.
Figure 6:
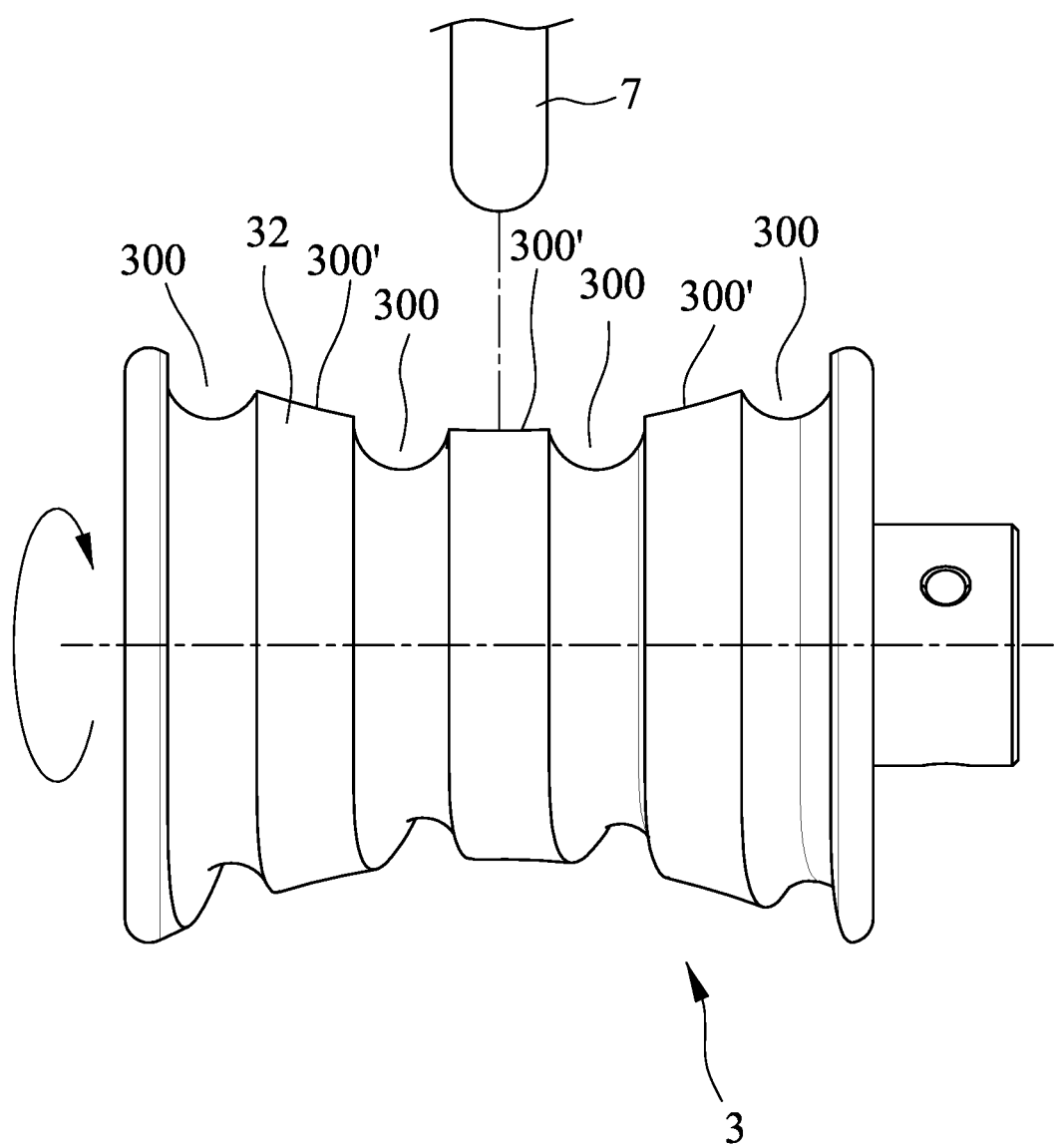
FIG. 6 is a fragmentary schematic front view illustrating the configuration of the tool and the camshaft machined by the tool.

The camshaft 3 is connected with a power source (not shown) and driven thereby to rotate about the third axis L3. The camshaft 3 includes a shaft rod 31 extending along the third axis L3, and a cam body 32 sleeved on the shaft rod 31. As shown in FIG. 5, the cam body 32 has an outer surface 320 adjacent to the periphery 211 of the body 21. With further reference to FIG. 6, the cam body 32 further has a plurality of cam portions 300'. Each cam portion 300' has a cross-section perpendicular to the third axis L3, which has a first end 321 nearest to the shaft rod 31 and a second end 322 farthest from the shaft rod 31 rand diametrically opposite to the first end 321. Referring to FIGS. 4 and 5, the outer surface 320 of the cam body 32 has four grooves 300, which are disposed around the third axis L3 and which are spatially communicated with four corresponding ones of the accommodating recesses 200, respectively. Each groove 300 has a cross-section in the direction parallel to the first axis L1 selected from the group consisting of the trapezoid, arc, and Gothic arc. In the first embodiment, each groove 300 preferably has an arc-shaped cross-section in the direction parallel to the first axis L1, which corresponds to the spherical shape of each contact member 4. As shown in FIG. 4, the region formed between each groove 300 and the corresponding accommodating recess 200 provides a confining space S. Each confining space S extends partially along a tangential direction of the rotary disk 2.

Referring to FIG. 6, since each of the grooves 300 has a cross-section selected from the trapezoidal, arc, and Gothic arc, only a simple machining process and simplified machining tools for machining of the camshaft 3 are required, and in case the cutting processes are adopted, a tool 7 corresponding to one of the above shapes of the grooves 300 can be assumed to cut to form the desired cross-section of the grooves 300. In addition, when performing the machining operation, the camshaft 3 needs to rotate about its axis, i.e., the third axis L3. The tool 7 is driven by a driving device (not shown) that has four degrees of movement freedom, that is, three translational (X, Y, and Z) and one rotational (rotation about X, Y, or Z), rather than more complex equipment containing two rotating axes, which can effectively simplify the processing equipment.

Referring back to FIGS. 4 and 5, the contact members 4 are respectively positioned in the confining spaces S and freely rolled to transmit the rotational power of the camshaft 3 to the rotary disk 2. In the first embodiment, because the cross-section of each accommodating recess 200 is an arc in the direction parallel to the first axis L1, each contact member 4 is preferably a spherical ball made of metal material. It should be noted that, in the actual implementation of the first embodiment, the contact members 4 with elliptical or cylindrical cross-sections may also be used according to the different cross-sections of the accommodating recesses 200 in the direction parallel to the first axis L1. The contact members 4 can also be made of other rigid materials such as ceramics, plastic steel, and wood, not limited to metals, as long as the effect of transmitting rotational power can be performed.

Figure 7:
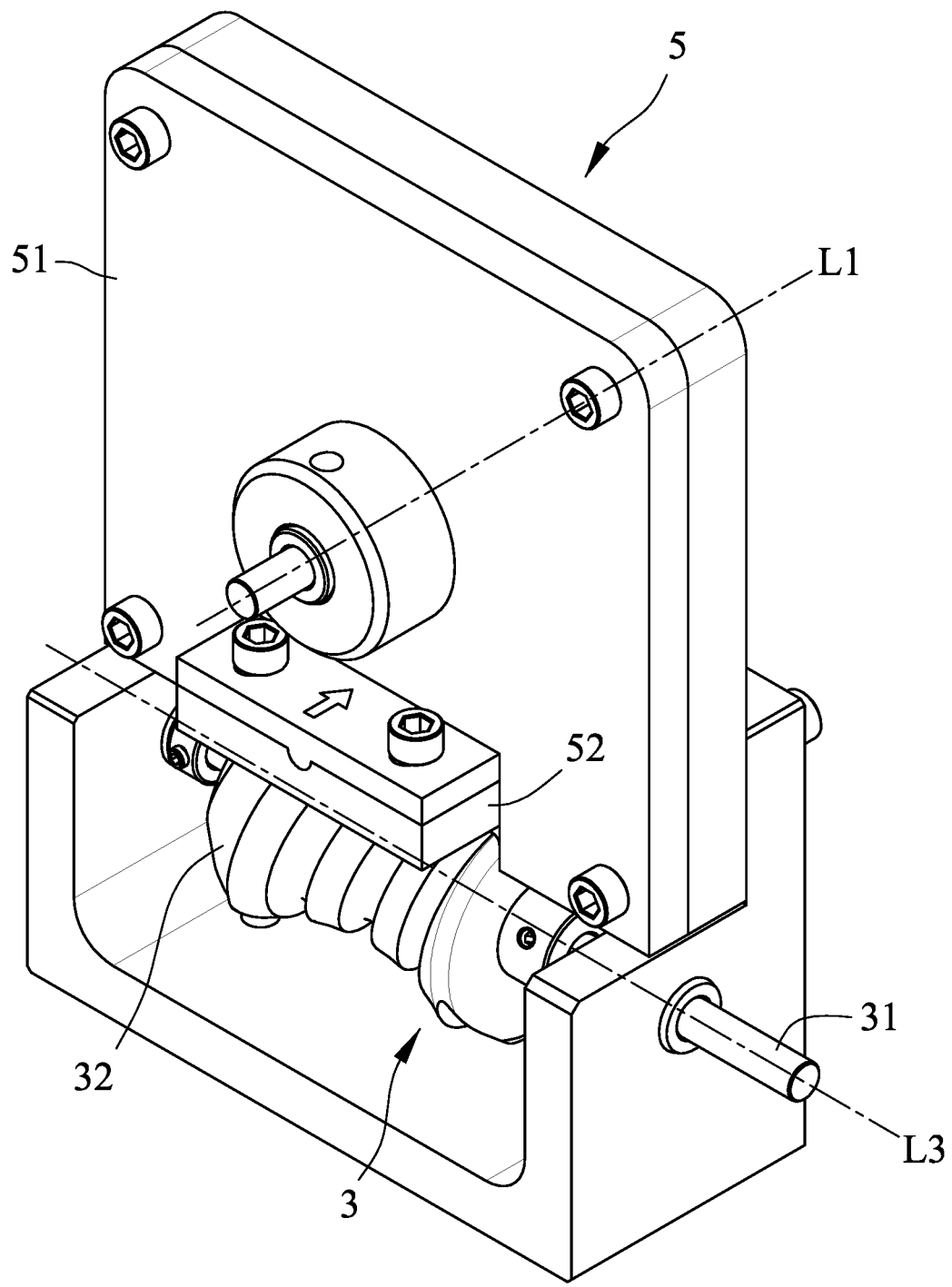
FIG. 7 is a perspective view of the first embodiment, illustrating a housing having an adjustable member.

Referring to FIG. 7 in conjunction with FIG. 4, the housing 5 shields partially the confining spaces S to confine the contact members 4 therewithin, respectively. The housing 5 includes a housing body 51 configured to shield the rotary disk 2 and the confining space S. The housing 5 further includes an adjustable member 52 that is attached to the housing body 51 and movable relative to said housing body 51 in a direction parallel to the first axis L1, thus changing distances between the contact members 4 and walls of said rotary disk 2 defining said recesses 200, respectively. The contact members 4 can be kept from being offset in the confining space S by properly adjusting the adjustable member 52. Thus, in addition to ensuring that the contact members 4 are maintained in the desired position for transmitting torque, the forces in directions other than torque transmission direction are transmitted to the housing 5, thereby reducing the load borne by the revolving disk 2.

Figure 8:
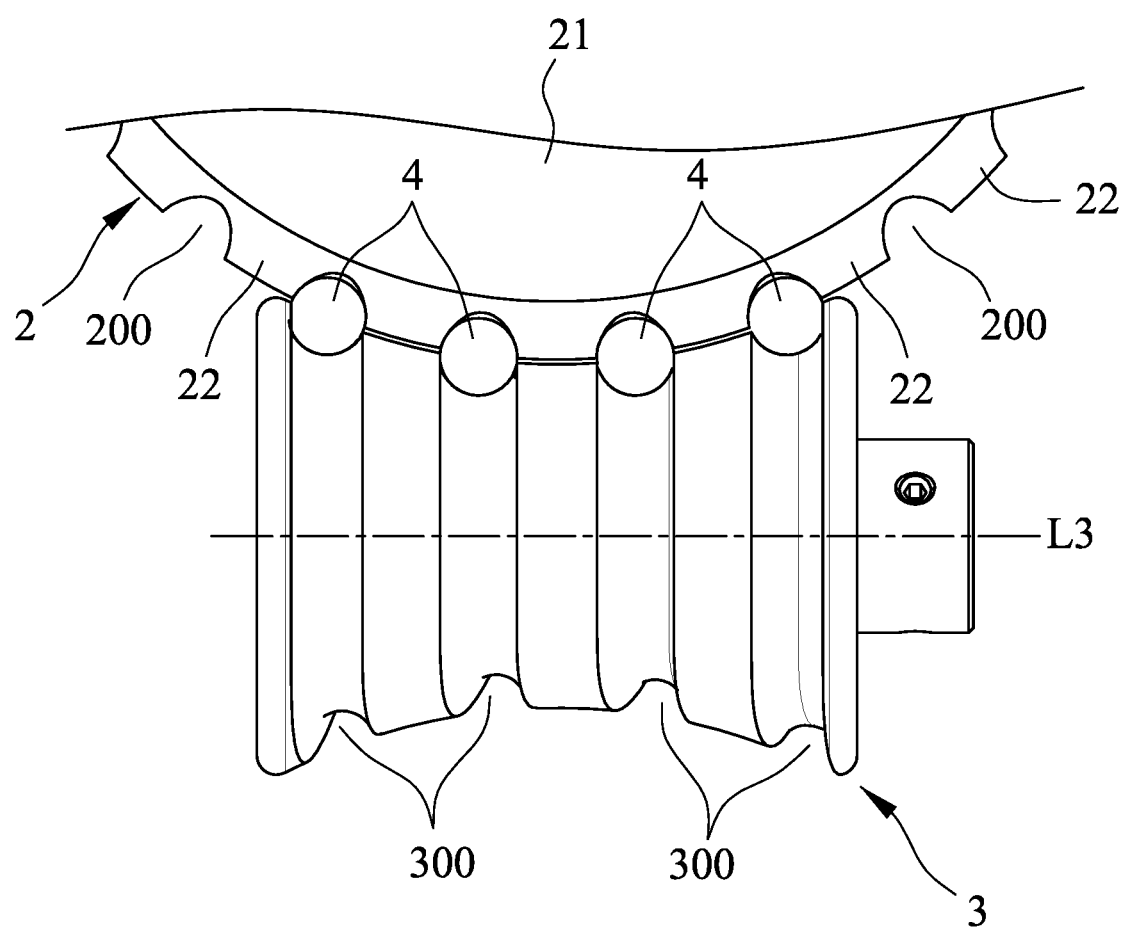
FIG. 8 is a fragmentary schematic front view illustrating that the camshaft transmits rotational power to the rotary disk via a plurality of contact members of the first embodiment.
Figure 13:
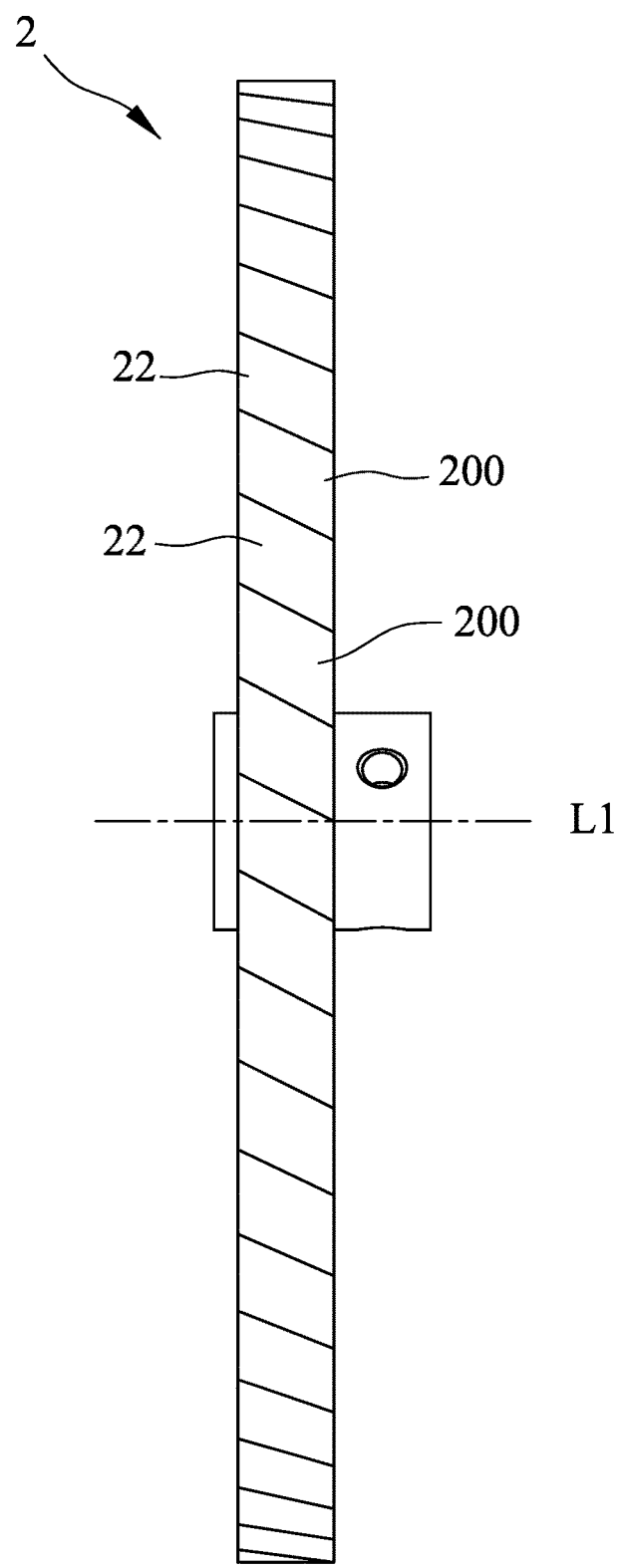
FIG. 13 is a side view illustrating said rotary disk.

Referring to FIG. 8 in conjunction with FIGS. 3 and 4, when the camshaft 3 rotates about the third axis L3 as a result of the power source output, a circumferential component force transmitted by the contact members 4 is produced while the contact members 4 roll in the confining spaces S. Since the accommodating recess 200 of the rotary disk 2 are inclined, as shown in FIG. 13, the rotary disk 2 can rotate for rotational power transmission purpose. For each confining space S, the volume thereof will vary during rotation of the camshaft 3. Specifically, when the camshaft 3 is rotated to a position where the first end 321 of each cam portion 300' of the cam body 32 contacts the corresponding contact member 4, the volume of the confining space S is the largest, and the corresponding contact member 4 separates from the corresponding accommodating recess 200 and is retracted into the corresponding groove 300. When the camshaft 3 is further rotated to another position where contact member 4 is aligned with next accommodating recess 200 and the second end 322 of the cam body 32 contacts the contact member 4, the volume of the confining space S (which is now defined between the groove 300 and the next accommodating recess 200) is the smallest, and the contact member 4 will be urged to move into the next accommodating recess 200, so that the power transmission can be continued.

The contact members 4 can roll freely in the confining spaces S respectively. The movement of the contact members 4 is restricted in spaces surrounded by the housing 5, the rotary disk 2, and the camshaft 3. Therefore, no additional requirement for the high-precision fixing structures of the contact members 4 as in the prior art, nor other positioning mechanisms, including magnetic attraction, springs, etc., significantly simplifying the manufacturing process. In addition, the free-rolling of the contact members 4 can also disperse and transmit forces in the directions other than the required transmission direction to the housing 5, so as to reduce the structural load of the rotary disk 2 and the camshaft 3 during operation. Accordingly, increasing their structural rigidity through volume or arrangement of other components is not necessary to improve physical strength. In case that miniaturized structure is required, and the load of the structure is maintained to be relatively small, it is only necessary to reduce the overall size.

It should be noted that each cam portion 300' of the cam body 32 of the camshaft 3 has the first end 321 nearest to the shaft rod 31 and the second end 322 farthest from the shaft rod 31. In this arrangement, only when the second end 322 rotates to pressure against the contact members 4, the rotary disk 2 can be driven for generating intermittent torque transmission.

Figure 9:
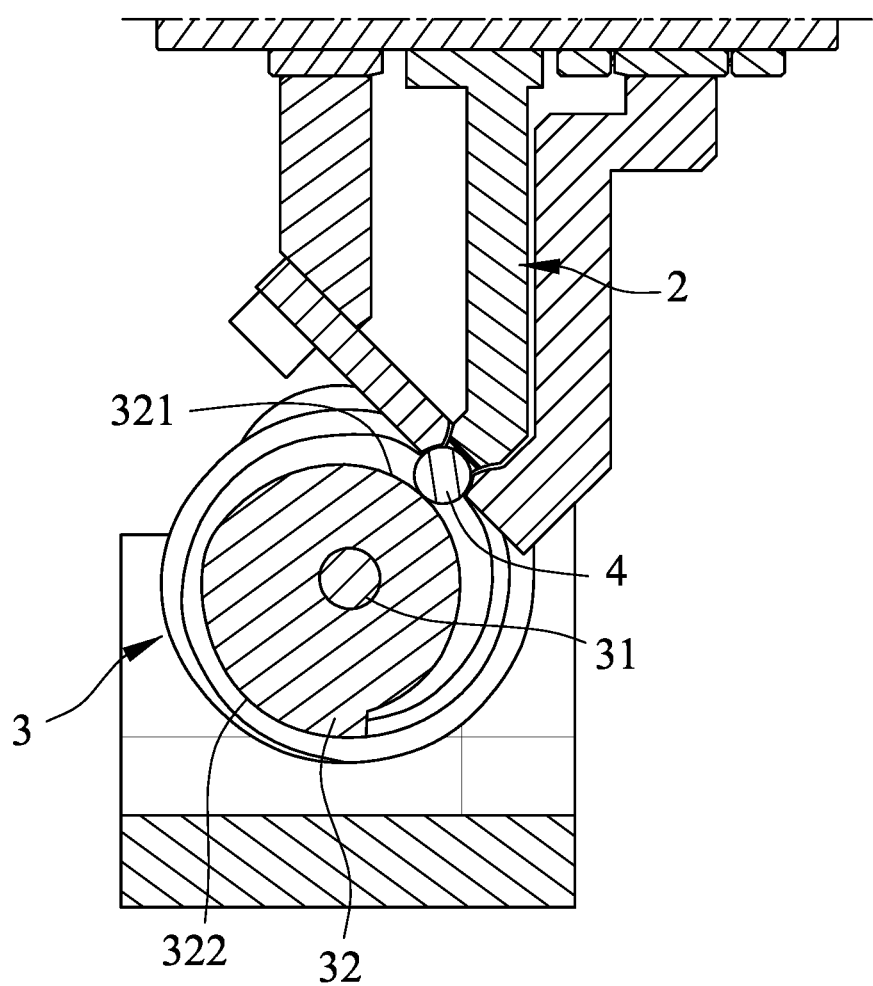
FIG. 9 is a sectional view illustrating a contact position between the camshaft and the contact member.
Figure 10:
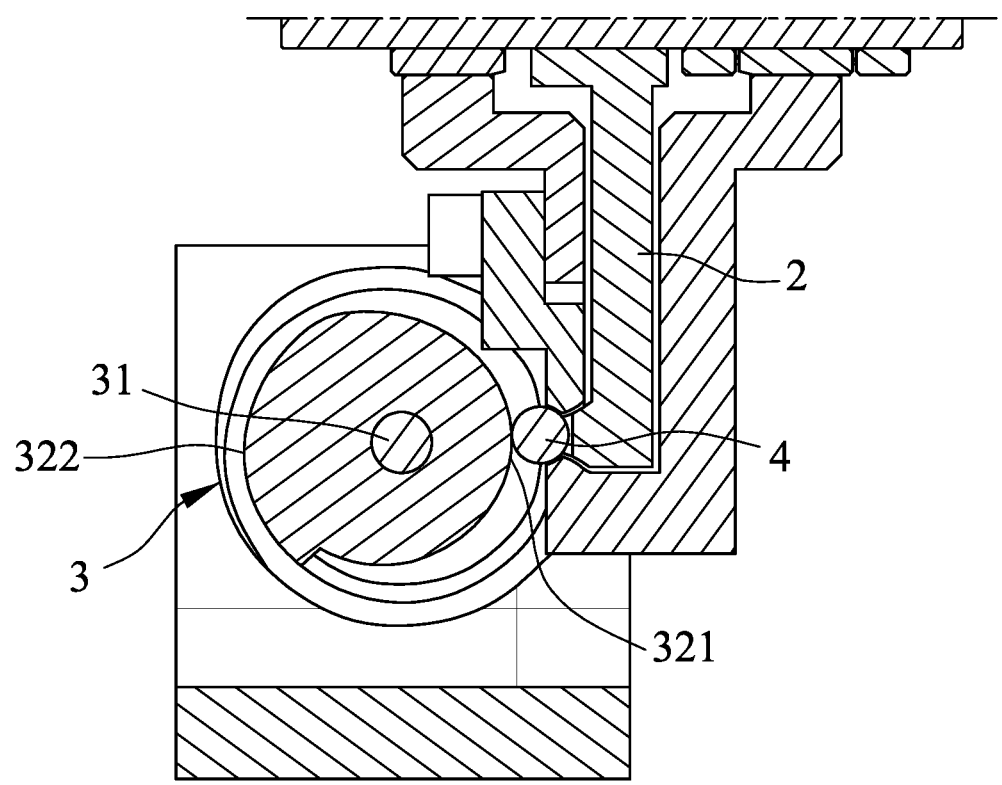
FIG. 10 is a sectional view illustrating another contact position between the camshaft and the contact member.

In this embodiment, the camshaft 3 contacts vertically the contact member 4, as shown in FIG. 5. In actual implementation, as shown in FIGS. 9 and 10, the contact angles between the camshaft 3 and the contact member 4 can be altered following other requirements, such as 45 degrees in FIG. 9. In FIG. 10, the camshaft 3 contacts horizontally the contact member 4.

Figure 11:
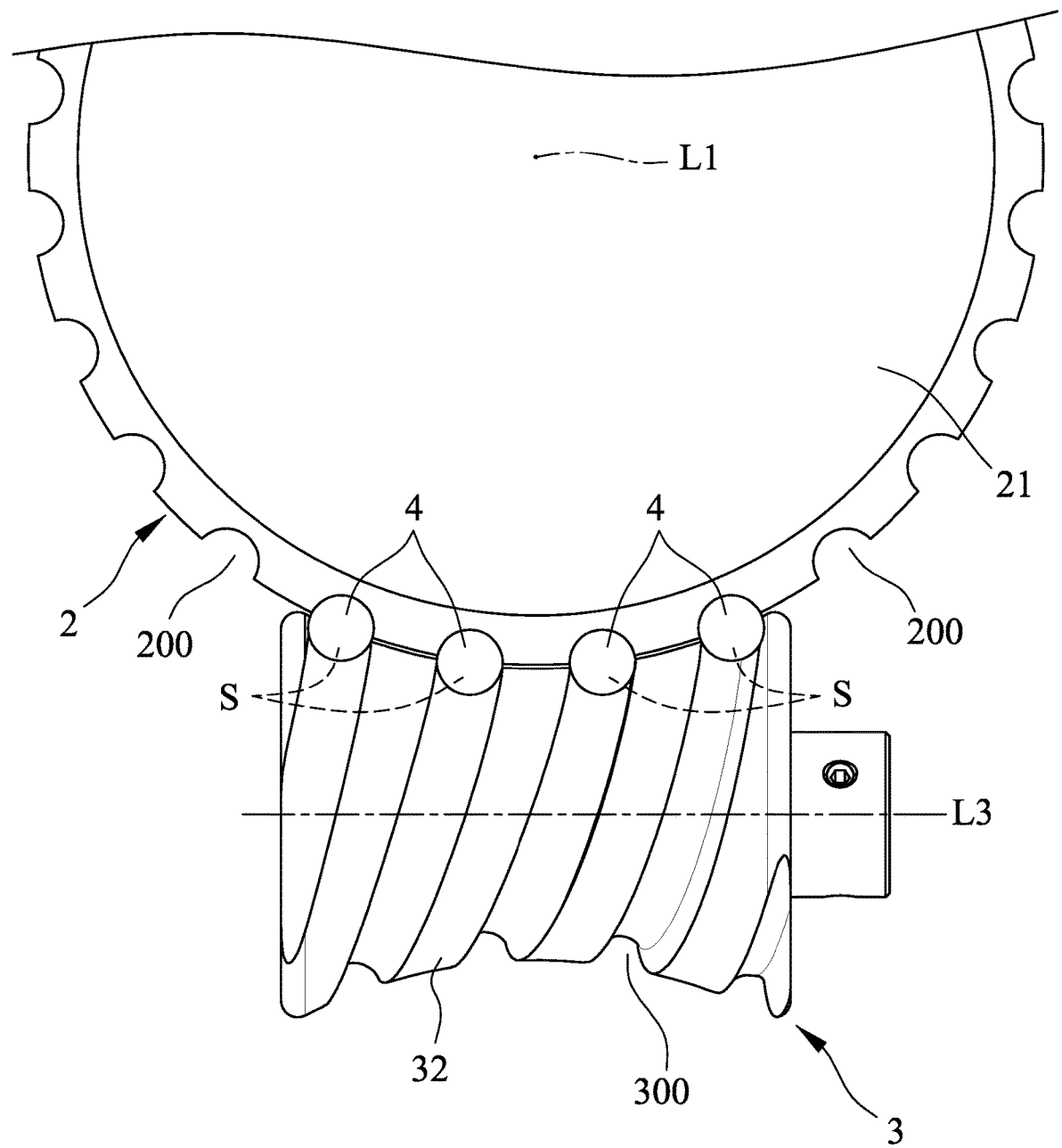
FIG. 11 is a fragmentary front view illustrating a second embodiment of the cam transmission mechanism according to the disclosure.

Referring to FIG. 11, the second embodiment has a structure similar to that of the first embodiment. The main difference between this embodiment and the previous embodiment resides in the configuration of the accommodating recesses 200 and the grooves 300. Each accommodating recess 200 extending through the rotary disk 2 in a direction parallel to the first axis L1, and the cam body 32 of the camshaft 3 has a spiral groove 300 surrounding the third axis L3. A part of each confining space S extending along a tangential direction of the rotary disk 2 is constituted by a portion of the spiral grooves 300. When the contact members 4 roll in the groove 300, a circumferential component force will be applied to the rotating disk 2 to rotate the same, thus transmitting the rotational power of the camshaft 3. Four accommodating recesses 200 are utilized in the transmission of rotational power to achieve the rotational power transmission to the same effect as in the first embodiment. The second embodiment has the same advantages as those of the first embodiment.

Figure 12:
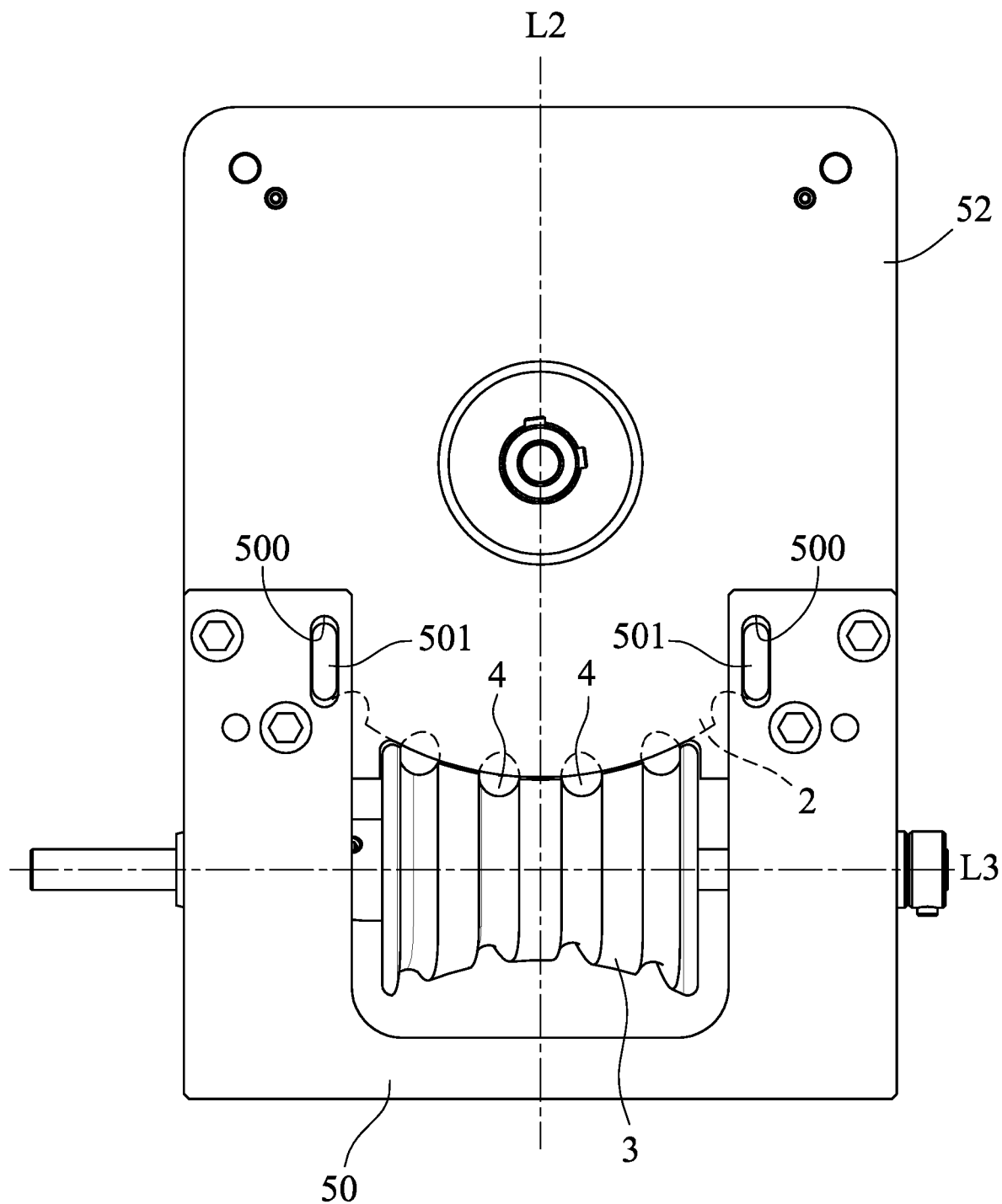
FIG. 12 is a front view illustrating a third embodiment of the cam transmission mechanism according to the disclosure.

Referring to FIG. 12, the third embodiment has a structure similar to that of the first embodiment. The main difference between this embodiment and the first embodiment is that the housing 5 includes a housing seat 50 for installing the camshaft 3, and an adjustable member 52 attached to the housing seat 50 and movable relative to the housing seat 50 in a direction parallel to the second axis L2 for changing distances between the contact members 4 and walls of the rotary disk 2 defining the recesses 200, respectively. The adjustable member 52 has movement freedom in the direction parallel to the second axis L2. Specifically, two slide slots 500 are formed in the housing seat 50, and two locking blocks 501 are disposed on the adjustable member 52. The slide slots 500 extend along a direction parallel to the second axis L2 The locking blocks 501 are movably disposed in the slots 500, respectively, such that the adjustable member 52 can be moved relative to the housing seat 50 by pushing the adjustable member 52 to change the distances between the rotary disk 2 and the contact members 4 in a direction parallel to the second axis L2. Besides, the third embodiment can achieve exactly the same effect as the first embodiment and the second embodiment.

To sum up, the cam transmission mechanism of the present disclosure achieves the purpose of mechanical power transmission through the freely rolling contact members 4, so that there is no need to provide additional fixing structures or positioning mechanisms for the contact members 4, and the processing equipment for the rotary disk 2 and the camshaft 3 are relatively simplified. Besides reducing the operating load of the rotary disk 2 and the camshaft 3, it is conducive for the need for miniaturization. Therefore, the object of the present disclosure can be achieved indeed.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A cam transmission mechanism, comprising:
    a revolving disk rotatable about a first axis, including a disc-shaped body having a periphery formed with a plurality of projections, any two adjacent ones of said plurality of projections which defining an accommodating recess therebetween; and
    a camshaft adjoining said rotary disk along a second axis that is perpendicular to the first axis and rotatable about a third axis that is perpendicular to both said first axis and said second axis, said camshaft including:
        a shaft rod, and
        a cam body sleeved on said shaft rod, said cam body having an outer surface abutting against said periphery and at least one groove that is formed in said outer surface and that is communicated with some of said accommodating recesses, said at least one groove and said accommodating recesses cooperating to form a plurality of confining spaces, respectively, each extending partially along a tangential direction of said rotary disk;
    a plurality of contact members, each accommodated freely rollably in said confining spaces for transmitting rotational power of said camshaft to said rotary disk; and
    a housing receiving said rotary disk so as to confine said contact members therebetween and in said confining spaces, respectively.

2. The cam transmission mechanism as claimed in claim 1, wherein:
    each of said accommodating recesses extends through said rotary disk in a direction inclined relative to said first axis; and
    said cam body has a plurality of grooves surrounding said third axis.

3. The cam transmission mechanism as claimed in claim 1, wherein:
    each of said accommodating recesses extends through said rotary disk in a direction parallel to said first axis; and
    said at least one groove of said cam body is a spiral groove surrounding said third axis.

4. The cam transmission mechanism as claimed in claim 1, wherein each accommodating recess of said rotary disk has an arc-shaped cross-section in a direction parallel to said first axis.

5. The cam transmission mechanism as claimed in claim 1, wherein said at least one groove of said camshaft has an arc-shaped cross-section in the direction parallel to said first axis.

6. The cam transmission mechanism as claimed in claim 1, wherein said cam body of said camshaft further has a plurality of cam portions, each of said cam portions having a cross-section perpendicular to said third axis, which has a first end nearest to said shaft rod and a second end diametrically opposite to said first end and farthest from said shaft rod.

7. The cam transmission mechanism as claimed in claim 1, wherein each contact member is a ball.

8. The cam transmission mechanism as claimed in claim 1, wherein said housing includes a housing body and an adjustable member attached to said housing body and movable relative to said housing body in a direction parallel to said first axis for changing distances between said contact members and walls of said rotary disk defining said recesses, respectively.

9. The cam transmission mechanism with as claimed in claim 1, wherein said housing includes a housing seat for installing said camshaft and an adjustable member attached to said housing seat and movable relative to said housing seat in a direction parallel to said second axis for changing distances between said contact members and walls of said rotary disk defining said recesses, respectively.

* * * * *